(12) United States Patent
Boric et al.

(10) Patent No.: US 12,169,491 B1
(45) Date of Patent: Dec. 17, 2024

(54) DYNAMIC SELECTION OF PLAN INTERPRETATION TO PERFORM QUERIES

(71) Applicant: Amazon Technologies, Inc., Seattle, WA (US)

(72) Inventors: Nemanja Boric, Berlin (DE); Venkatraman Govindaraju, Fremont, CA (US); Demala Palliye Gurunnanselage Shermal Ruwantha Fernando, Berlin (DE); Naresh Chainani, Mountain View, CA (US); Ippokratis Pandis, Menlo Park, CA (US); Kiran Kumar Chinta, Fremont, CA (US); Hui Shi, Santa Clara, CA (US); Hanna Loboda, Longmont, CO (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/936,344

(22) Filed: Sep. 28, 2022

(51) Int. Cl.
*G06F 16/00* (2019.01)
*G06F 16/2453* (2019.01)
*G06F 16/2455* (2019.01)

(52) U.S. Cl.
CPC .... *G06F 16/24542* (2019.01); *G06F 16/2455* (2019.01)

(58) Field of Classification Search
CPC .................. G06F 16/24542; G06F 16/2455
USPC ................................................... 707/600–899
See application file for complete search history.

(56) References Cited

U.S. PATENT DOCUMENTS

| | | | |
|---|---|---|---|
| 9,053,210 B2 | 6/2015 | Elnikety et al. | |
| 9,317,554 B2 | 4/2016 | Shankar et al. | |
| 9,767,147 B2 | 9/2017 | Freedman et al. | |
| 10,831,784 B2 * | 11/2020 | Schwing | G06F 16/284 |
| 10,983,998 B2 * | 4/2021 | Richardson | G06F 16/24545 |
| 11,188,531 B2 * | 11/2021 | Leau | G06F 16/2433 |
| 11,455,308 B2 * | 9/2022 | Schwing | G06F 16/24554 |
| 2016/0321322 A1 | 11/2016 | Jaecksch et al. | |
| 2021/0064619 A1 * | 3/2021 | Fender | G06F 8/427 |
| 2021/0191928 A1 * | 6/2021 | Pantar | A23L 2/02 |
| 2023/0244663 A1 * | 8/2023 | Chandroliya | G06N 5/01 |
| | | | 707/713 |
| 2023/0281308 A1 * | 9/2023 | Maimon | G06F 21/563 |
| | | | 726/25 |

* cited by examiner

*Primary Examiner* — Michelle N Owyang
(74) *Attorney, Agent, or Firm* — S. Scott Foster; Kowert, Hood, Munyon, Rankin & Goetzel, P.C.

(57) ABSTRACT

Dynamic plan interpretation may be implemented to perform queries. A query is received at a database system. A plan to perform the query is generated. For at least a portion of the plan to perform the query, a domain-specific language may be applied to interpret and execute the portion of the plan to perform the query using one or more previously compiled executors instead of generating and compiling code to execute the portion of the plan. Returning a result of the query according to the execution of the plan.

20 Claims, 10 Drawing Sheets

*segment 610*

Looping through columns of a
hash table to obtain distinct
items

*code generation block for segment compilation 620*

```
for (int col = 0; col < m_num_aggrs; ++col) {
  print_stmt("HTI* ht_obj%d_%d = step%d-
             >DistinctHashTable(%d)",snm, col, snm, col);
  print_stmt("check_val(ht_obj%d_%d != nullptr)", snm, col);
  print_block("for (int i = 0; i < n; i++)");
  print_stmt("fprintf(stderr, \"loop body\"");
  print_endr();
}
```

*segment domain-specific language interpretation to use precompiled executor 620*

```
static_for (int col = 0; col < m_num_aggrs; ++col) {
  HTI* ht_obj{col} = step->DistinctHashTable({col});
  check_val(ht_obj{col} != nullptr);
  for (int i = 0; i < n; i++) {
    fprintf(stderr, "loop body");
  }
}
```

FIG. 6

DYNAMIC SELECTION OF PLAN INTERPRETATION TO PERFORM QUERIES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

BRIEF DESCRIPTION OF THE DRAWINGS

FIG. 6 illustrates example segments translated for using previously completed executors and generated code for compilation, according to some embodiments.

Figure 1:
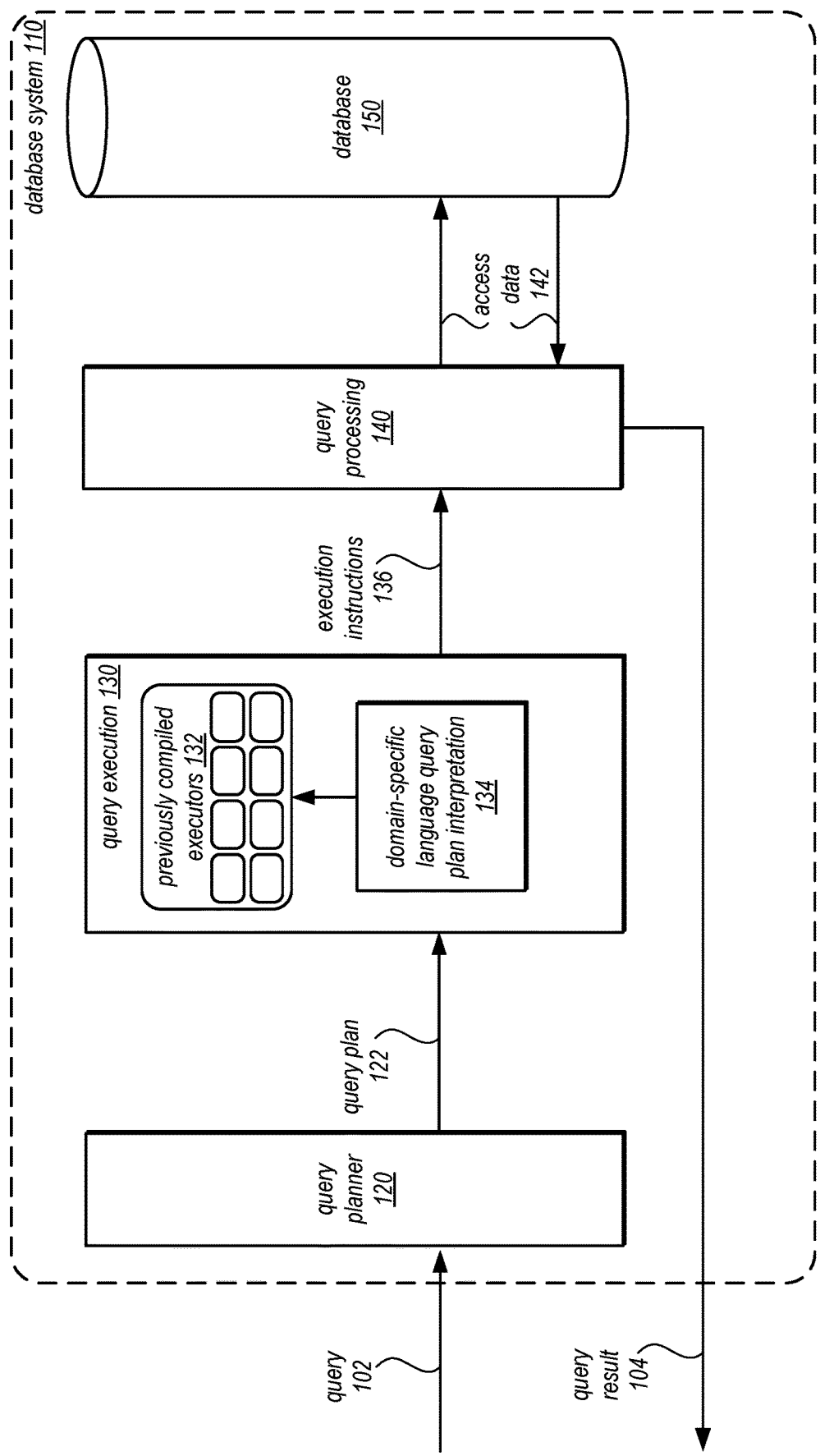
FIG. 1 is a logical block diagram illustrating dynamic plan interpretation to perform queries, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic plan interpretation to perform queries are described herein. Code generation and compilation provides a technique for performing queries using a compiler to optimize performance of code generated to perform queries at runtime (e.g., in database systems that perform analytics or other high-computational workloads). For example, a compiler may apply different optimization rules or techniques to order, combine, or otherwise produce efficient executable instructions (e.g., as executable binaries) to create an optimal version of the instructions to perform a query. However, Code generation and compilation is not without other performance costs.

For example, query execution time is affected by compilation time. In some scenarios, the cost of the compilation time may exceed the benefit of using generated and compiled code for a query. Moreover, while cached versions of compiled code objects generated for previous queries can be used when queries are the same as (or similar to) previous queries, when a different query that has not been previously received is performed, the cached versions may not be usable to perform the different query. Furthermore, even if cached versions may eventually be useful to perform queries, there may be a warm-up period where cached versions do not yet exist and these initial queries may suffer the code generation and compilation costs.

Techniques for dynamic plan interpretation to perform queries may address these example scenarios, as well as various others, where it may be more performant to perform (at least some of) a query without compilation. Query plans may be interpreted using a domain-specific language that provides a control flow for using previously compiled executors that perform one (or more) operations of a query plan. In this way, various performance benefits can be achieved. For example, variation in query runtime can be substantially reduced. Irrespective of whether a query ran just after database system starts (e.g., after being restarted for a software patch) or the query never ran before, the query's runtime can be in proportion to the data it is processing as the previously compiled executors for some (or all) of the query can be used. Sub-second queries, for instance, can run in sub-second times irrespective of whether the queries ran before or not. Short running queries for which query compilation time may exceed the time to perform the query using interpretation may be instead performed using interpretation to avoid the query compilation time penalty. Techniques to pre-warm a code object cache may be avoided as queries never ran may not be penalized for compilation time. Additionally, by moving the compiler out of the query performance path, larger segments can be compiled with all the optimizations, producing faster code, as well as reducing dependence on compiler upgrades. This compiled code can then be used for performing subsequent queries, while allowing for initial one (or more) queries to take advantage of dynamic interpretation for queries.

FIG. 1 is a logical block diagram illustrating dynamic plan interpretation to perform queries, according to some embodiments Database system 110 may be a database or other data store that provides management, maintenance, and/or access to data or information. For example, database 110 may be a relational database that provides online transactional processing (OLTP), such as may be found in databases supporting transaction heavy workloads, or online analytical processing (OLAP), such as may be data warehouse style databases that support heavy analytical workloads. Databases system 110 may be a distributed database system (e.g., similar to processing clusters discussed below with regard to FIGS. 2 and 3) or may be a non-distributed database system, in other embodiments.

Database system 110 may receive a query 102. Query 102 may be specified according to a query language, protocol, Application Programming Interface (API) or other format, in various embodiments. Query planner 120 may generate a query plan 122 using various query planning techniques (e.g., cost-based optimizations, etc.). The query plan 122 may then be provided to query execution 130 for performing the query.

Figure 7:
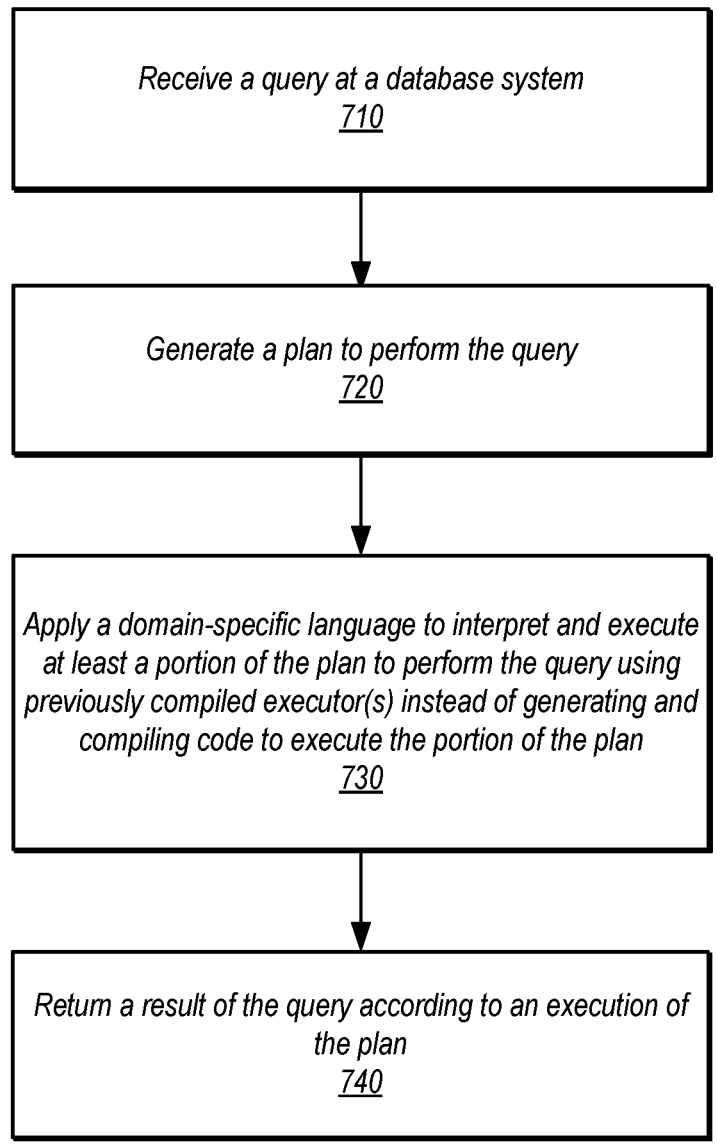
FIG. 7 is a high-level flowchart illustrating methods and techniques to implement dynamic plan interpretation to perform queries, according to some embodiments.

Query execution 130 may implement domain-specific language query plan interpretation 134 which may be used to determine a control-flow for different portions of query plan 122 (e.g., segments as discussed below with regard to FIG. 5) to then invoke the previously compiled executors 132 to perform portions (or all of) query plan 122, as discussed in detail below with regard to FIG. 7. Previously compiled executors 132 may be invoked by the domain-specific language to perform different operation(s) of the query. For example, previously compiled executors 132 may be binary files (or other ready-to-execute instructions) that can be provided direct to query processing 140 (e.g., to perform scans, projections, filters, and/or various other query plan operations) Execution instructions 136 generated according to the previously compiled executors 132 may be provided to query processing components 140 (e.g., distributed components, such as compute nodes in FIGS. 2-3, or a single processing component). In some embodiments, query execution 130 may choose between using previously compiled executors 132 and generating code and compiling the code at runtime, as discussed in detail below with regard to FIG. 8. In some embodiments, query execution 130 may perform code generation and compilation in the background so that a compiled version of a portion of a query plan (e.g., a segment) can be used to complete a query even if a previously compiled executor was used for the same plan portion at a prior iteration of executing the query, such as between work unit boundaries as discussed in detail below with regard to FIG. 9. Query processing 140 may then access data 142 in database 150 in order perform the query and return a query result 104.

Please note that the previous description of a database system is a logical description and thus is not to be construed as limiting as to the implementation of these features.

This specification continues with a general description of a provider network that implements database services (or other data storage or processing services) that may implement dynamic plan interpretation to perform queries to perform database queries. Then various examples of one such database service, including different components/modules, or arrangements of components/module that may be employed as part of implementing the techniques are discussed. A number of different methods and techniques to implement dynamic plan interpretation to perform queries, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
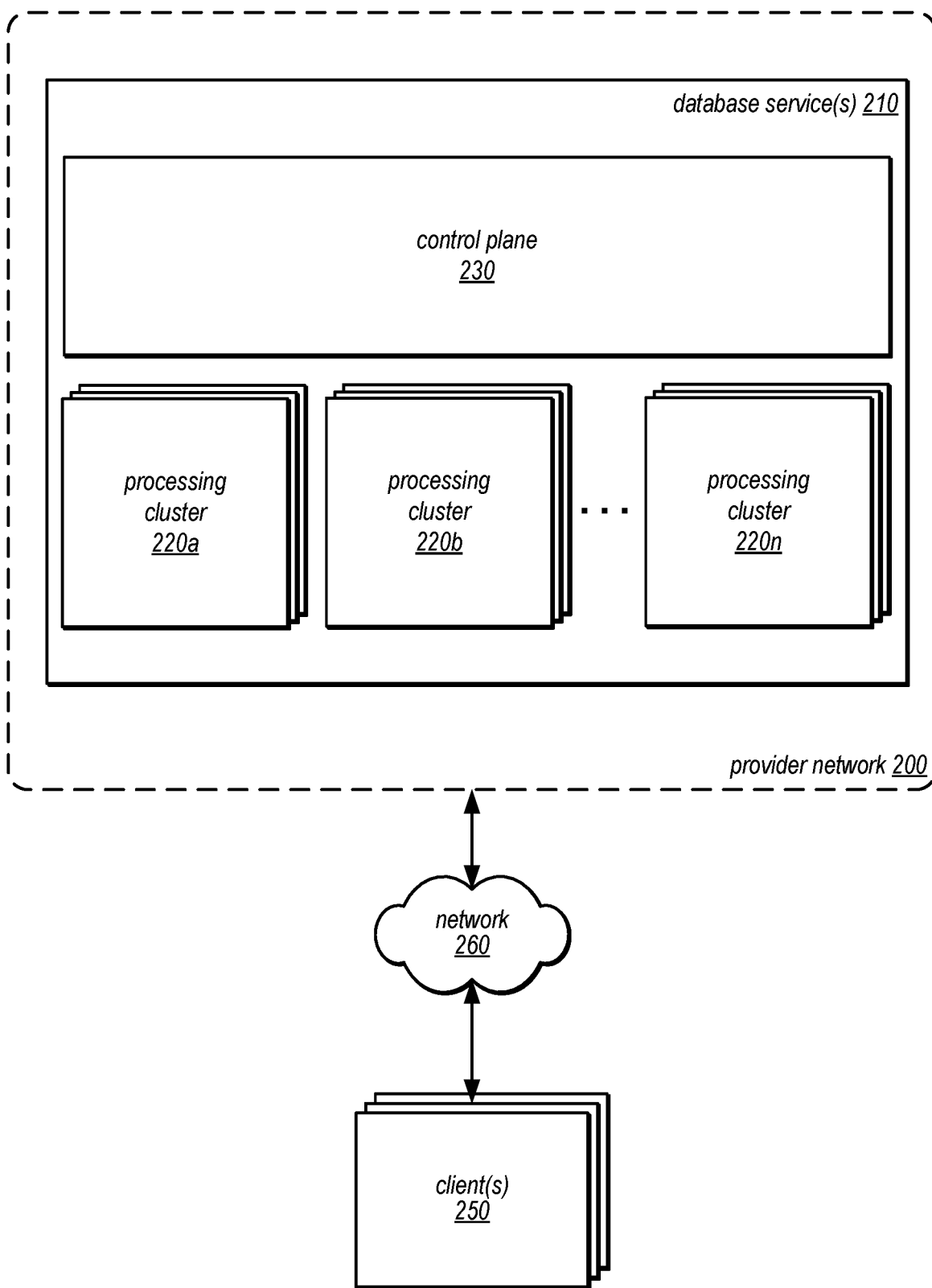
FIG. 2 is a logical block diagram illustrating a provider network offering a database service that provides dynamic plan interpretation to perform queries for databases hosted in the database service, according to some embodiments.

FIG. 2 is a logical block diagram illustrating a provider network offering a database service that provides dynamic plan interpretation to perform queries for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services 210 to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service (not illustrated), in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
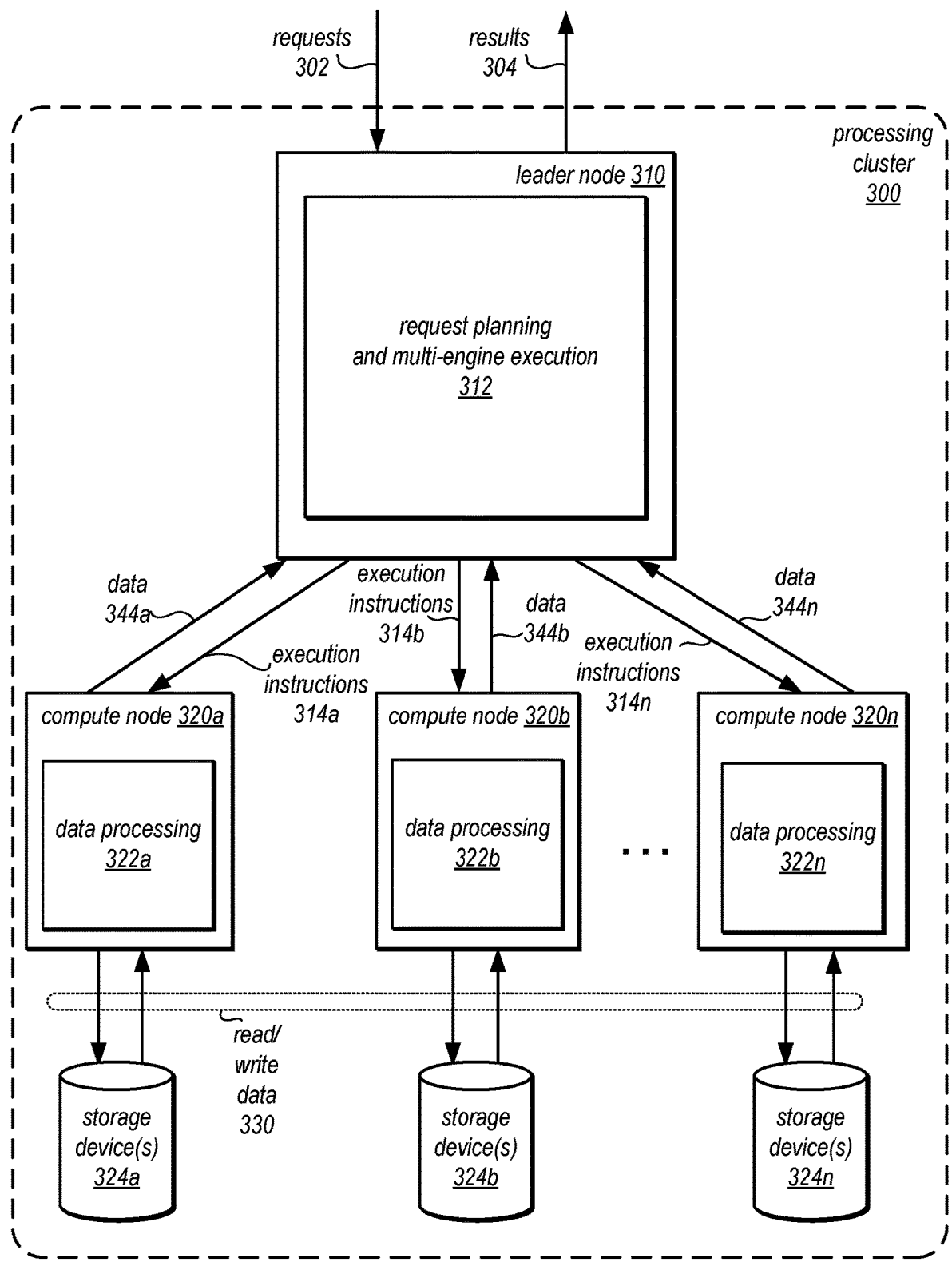
FIG. 3 is a logical block diagram illustrating a processing cluster of a database service that implements dynamic plan interpretation to perform queries to perform queries to databases, according to some embodiments.

FIG. 3 is a logical block diagram illustrating a processing cluster of a database service that implements dynamic plan interpretation to perform queries to perform queries to databases, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning and multi-engine execution 312 to generate plan(s) and instructions 314 for executing various requests 302, such as query, or requests to update, add, modify, or remove data, on processing cluster 300, in some embodiment. As discussed in detail below with regard to FIG. 4, in some embodiments, the request planning may implement request planning and multi-engine execution 312 so as to use either or both code generation/compilation and plan interpretation in various scenarios to perform requests 302.

Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code or interpreted and/or previously compiled executors that is distributed by leader node 310 to various ones of the compute nodes 320 to carry out the steps needed to perform a query or other operation in request 302, including executing the operations to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning and multi-engine execution 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment.

Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
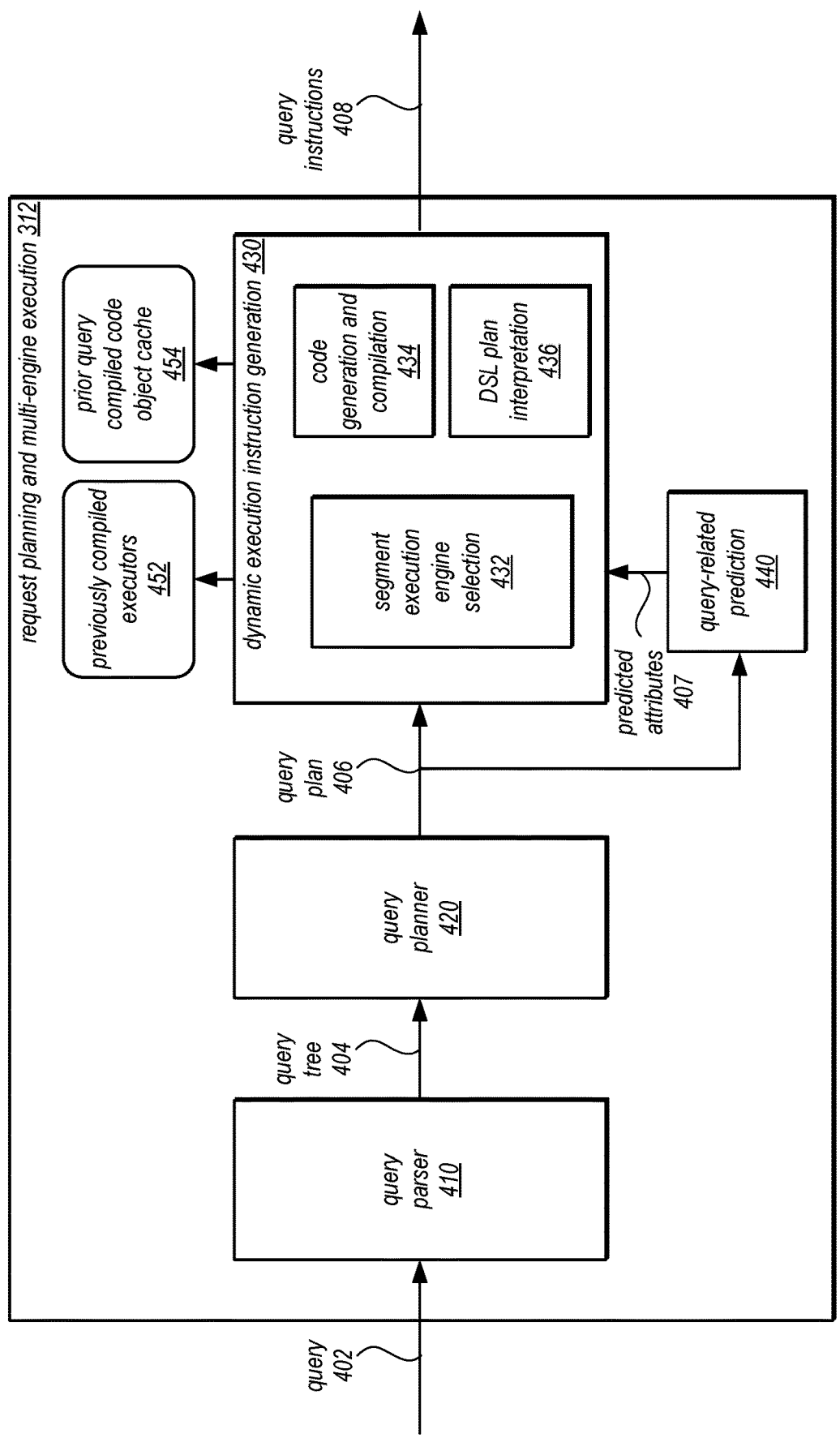
FIG. 4 is a block diagram illustrating request planning and multi-engine execution, according to some embodiments.

FIG. 4 is a block diagram illustrating request planning and multi-engine execution, according to some embodiments. Request planning and multi-engine execution 312 may receive a query 402 at query parser 410 which may generate a query tree 404 (or other representation) to provide to query planner 420. Query planner 420 may then apply various planning techniques to generate the query plan 406 which is provided to dynamic instruction generation 430 and query-related prediction 440.

Figure 8:
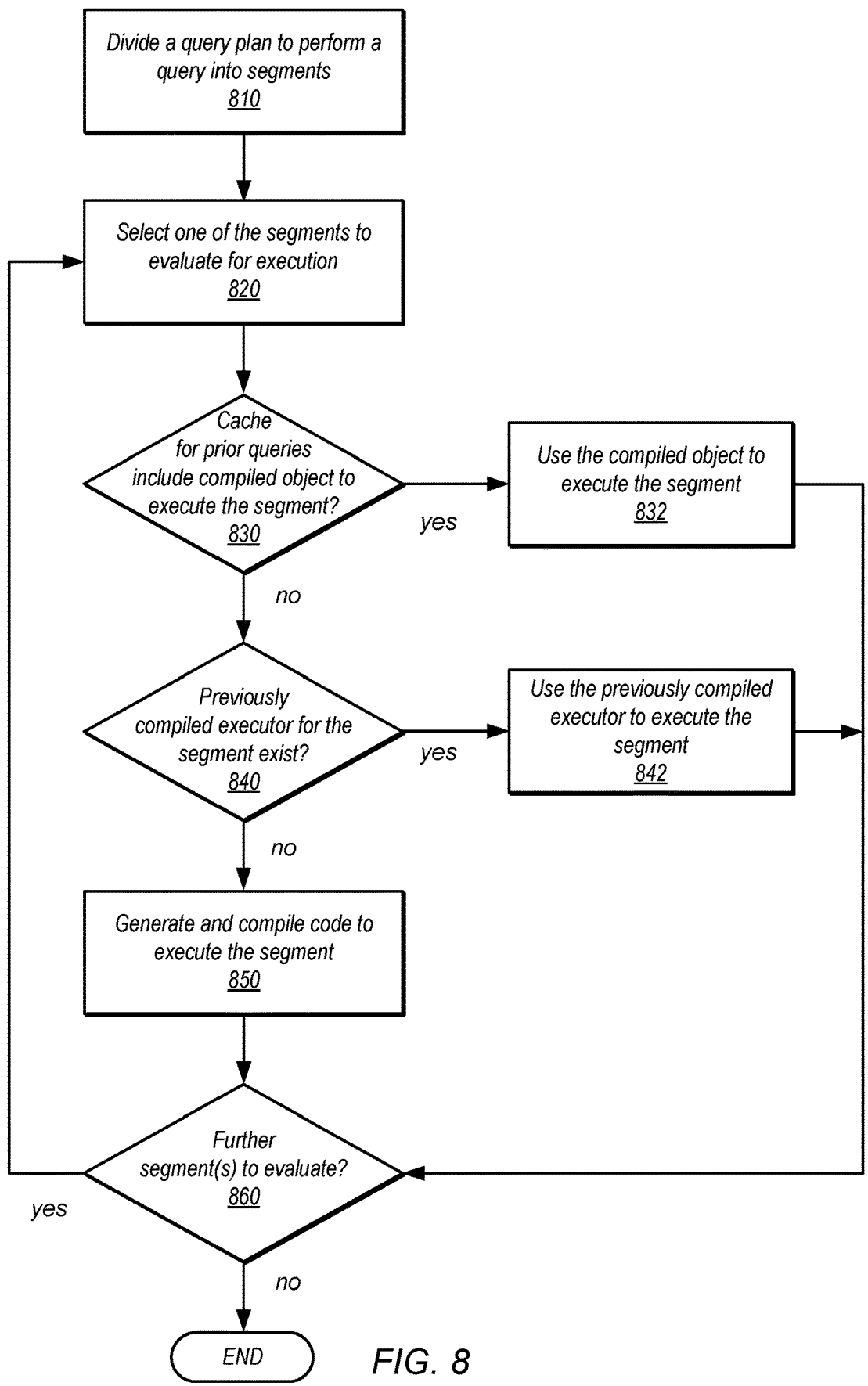
FIG. 8 is a high-level flowchart illustrating methods and techniques to implement evaluating segments of a query plan for execution, according to some embodiments.

Segment execution engine selection 432 may iterate through segments, as discussed below with regard to FIG. 8, and make selections between engines 434 and 436 for segments of the query plan to use previously compiled executors 452 through domain-specific language (DSL) plan interpretation 436, prior query compiled code object cache 454, and code generation and compilation 434 to produce query instructions 408.

Code generation and compilation 434 may use various code generation definitions to generate code for performing different steps of a query plan, in some embodiments. For example, a code definition may describe various "print statements" to describe what the code should be for a step as a print statement parameter (e.g., "print-stmt ("input-parameter")"). The resulting code generated by applying the code definition may then be compiled using a compiler (corresponding to the language of the code generated, such as a C++ compiler for C++ code), which generates executable code objects (e.g., binary objects) to perform the query instructions 408.

As discussed above with regard to FIG. 1, using DSL plan interpretation 436 of portions (or all) of a query plan, like query plan 406, may allow segment execution engine selection 432 to remove the tight coupling between query execution and generated code. Instead, dynamic instruction generation 430 can, for the portion of the query plan under consideration (e.g., the step, segment, or other grouping of operations), be described in a domain-specific language that does not require a change in the actual implementation of individual steps, segments, or other grouping of operations, in various embodiments.

While the cost of changing query execution steps, segments, or other grouping of operations implementation would be large, resulting in the migration of potentially thousands of lines of implementing code to provide dynamic interpretation, the domain-specific language may provide a control flow that is similar to the language of actual steps, segments, or other grouping of operations implementation (e.g., using query C++ as a domain-specific language for steps, segments, or other grouping of operations that are implemented in C++). In this way, the domain-specific language allows for description of the state of steps, segments, or other grouping of operations to be performed in a declarative way, decoupling the steps, segments, or other grouping of operations execution from the underlying implementation code. Furthermore, this allows for multiple execution engines, such as DSL plan interpretation 436 and code generation and compilation 434 to be available for executing as part of the same database system.

For example, generating code to perform the steps, segments, or other grouping of operations will use print statements automatically for code generated and compiled at runtime. For steps, segments, or other grouping of operations that are to be interpreted, generic precompiled executors 452, one or more per step (e.g. one executor for the LEFT JOIN, one executor for INNER JOIN) that will be able to execute the query steps, segments, or other grouping of operations may be compiled and ready to execute. For instance, using the domain-specific language, what used to be inside a "print statement" as part of code generation, now becomes a raw statement (e.g., "print_stmt ("step % d→alloc ( )", snm)" is written as "step→alloc ( )"). Some features of statements (e.g., uniqueness of the names) may be provided at runtime during the translation. These previously compiled executors 452 may implement a common or same interface (e.g., API) to add input to the executor (e.g., in batches), get the output, to check if an executor's execution is finished, and so on.

One example description of an executor is given below:
class Executor {
   public:
      virtual~Executor ( );
      //Supports checking whether Executor is finished
      virtual Exec_plan*GetPlan( ) const=0;
      virtual bool IsDone( ) const=0;
      virtual void SetDone (bool done)=0;
      //Initialize the executor—called only once per lifetime of the
      //executor.
      virtual void Initialize (ExecutionState*);
      //Finalize the executor—called only once per lifetime of the
      //executor.
      virtual void Finalize (ExecutionState*);
      //Start the executor—called before inputs are added, may be
      //called multiple times. AddInput ( ) GetOutput ( ) are called only
      //after the Start ( ) before the Finish ( ) is called.
      virtual void Start (ExecutionState*);
      //Finish the executor.
      virtual void Finish (ExecutionState*);
      virtual void AddInput (Tuples*tuples);
      virtual Tuples*GetOutput ( );
};

During execution of the query plan, if a segment is not compiled, instead of waiting for the compile, segment execution engine selection 432 may instantiate the state machine that describes the execution plan containing of the previously compiled executors 452 (e.g., ScanFabricExecutor, AggregationExecutor, ReturnExecutor) and will pass the input from one into another, executing the execution plan as part of DSL plan interpretation 436.

Implementing and using previously compiled executors 452 as described in the example above may allow for efficient code reuse, as the implementation of previously compiled executors should be extensible. In various embodiments, the domain-specific language may support defining steps or groups of operations as inheriting the different steps or groups of operations and extending/overriding behaviors. In some embodiments, the domain-specific language may include static counterparts to provide a control flow statement, such as "static_if", "static_for", and static_switch, for example. These statements are translated to the if statements for the generated-code generator (so they don't appear in the actual generated code, but direct the code generation), but are also preserved in the precompiled executors.

In some embodiments, a previously compiled executor 452 or code generation definition may support primitive inheritance—by inheriting from a different portion of the executor or code generation definition one, some or all sections. In some embodiments, several predefined sections may map to the specific parts of query execution (e.g., "end_loop", "loop", etc.), but more can be defined. As noted above, composition/overriding parts of the sections may be supported. Such composition and overriding may be implemented by using an inject directive that will inject code from another section into the defined place. By overriding the specific sections in the derived definition, one can reuse the previously defined segments modifying only the parts of it.

To allow more flexibility in the execution and writing more performant code for both code generation and executors, a Boolean_executor may be implemented as part of previously compiled executors 452 which evaluates to true while generating the precompiled executor, so that code may be conditionally built specific for a previously compiled executor and for the generated code.

In some embodiments, previously compiled executors 452 may receive data from a database as tuples from a previous step in a query plan in batches, to enable vectorization and not process one row at a time. A step executor may contain methods to feed the input tuples into it, to get the output tuples out of it, and to control/inspect its flow, as indicated in the example executor description above. A state machine may be used to interpret the segment, feed the batches of the rows from the step executor to the step executor, until all the rows are processed. In some embodiments, previously compiled executors 452 may process the data of a database differently. For example, some executors may process the data as if it were stored in a row-oriented format (even if the data is not stored in row-oriented format). Conversely, in another example, some executors may process the data as if it were stored in a column-oriented format (even if the data is not stored in column-oriented format). Previously compiled executors 452 may be chosen at 432, including differences in data orientation format processing, according to an executor that may be most optimal for performing a step in a query plan.

As discussed below with regard to FIG. 8, many different factors or criteria may be considered as part of dynamic execution instruction generation 430 for segment execution engine selection 432. The existence of compiled code objects 454 for one or more steps (or other operations) in a segment (or entire segment) may be used to perform a portion of the query, and thus may provide query instructions 408 without performing either code generation and compilation 434 or DSL plan interpretation 436. In some embodiments, segment execution engine selection 432 may select from available executors 452 to perform a segment and/or may select between available executors 452 and potential code objects that may be generated and compiled at 434 to select a most performant one for executing a segment. As discussed in detail below with regard to FIG. 9, individual work units within a segment may cause a change from DSL plan interpretation 436 using previously compiled executors 452 to a compiled code object generated for the segment after the query was received and that is now ready to be used (instead of the executor).

In some embodiments, predicted attributes 407 of a query may be used by comparing the predicted attributes with various corresponding criteria to determine which query plan segments should utilize code generation and compilation 434 and DSL plan interpretation 436. For example, a predicted attribute 407 may be a query performance time that is compared with a threshold criteria. If less than the threshold criteria (e.g., less than 1 minute), then DSL plan interpretation 436 may be performed. If greater than the threshold, then code generation and compilation 434 may be performed. Other predicted attributes, such as resource usage (e.g., memory, processor, or other query processing resource usage) or compilation time, may also be evaluated with respect to different criteria to determine which engine 434 or 436 to use for a segment. Query-related prediction 440 may use various features of query plan 406 to make the prediction using various statistical, historical, and/or machine learning techniques (e.g., transforming query plan 406 into a feature vector for an machine learning model that can classify one or more features of the query (e.g., performance time, compilation time, etc.)).

In some embodiments, a just-in-time (JIT) engine may be used as part of DSL plan interpretation 436 to determine when to invoke previously compiled executors 452. This is because some code generation techniques may output code that is dependent on generated data structures (or other features) of a prior code generation step at runtime. As a precompiled executor is already compiled, it cannot rely upon a runtime generated data structure within the executor. Instead, the JIT engine may take as input a statement for translation, generate the data structure and then determine when to invoke the previously compiled executors 452.

In some embodiments, any failure during the query execution with precompiled executors may fallback to code generation and compilation 434 to perform that portion of the query. This can happen before and during the query execution, in which case we might need to restart the query. A reverse fallback scenario may be implemented in some embodiments, with a failure at code generation and compilation attempting to use DSL plan interpretation 436 to perform that portion of the query.

Figure 5:
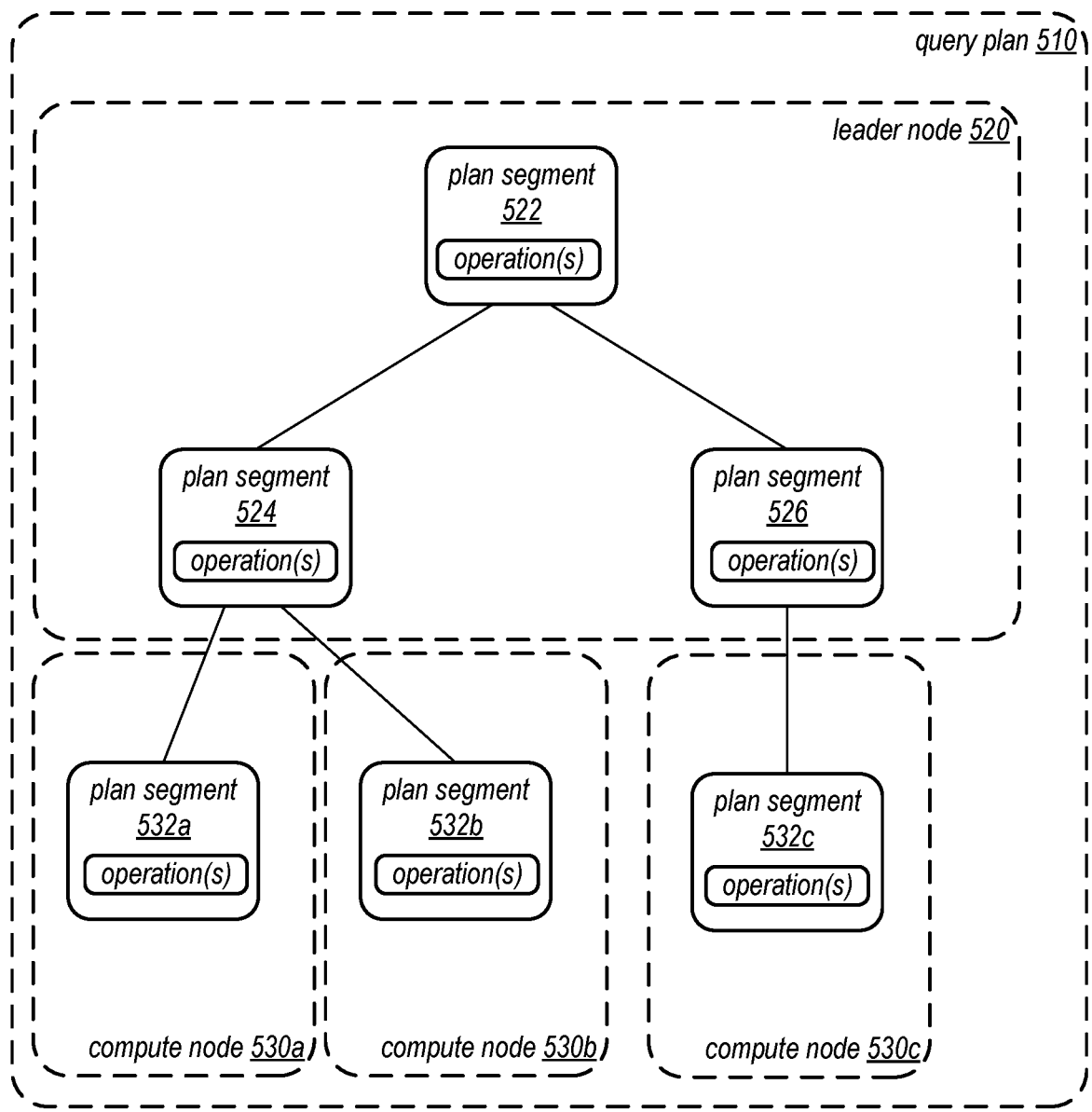
FIG. 5 illustrates an example query plan with different segments for execution, according to some embodiments.

FIG. 5 illustrates an example query plan with different segments for execution, according to some embodiments. Query plan 510 may include various operations. These operations may be divided into different components that perform the operations, such as leader node 520 and compute nodes 530*a*, 530*b*, and 530*c*. The operations may be grouped into respective plan segments of one (or more) operations (which may sometimes be referred to as steps), such as plan segments 522, 524, and 526 for leader node 520 and plan segments 532*a*, 532*b*, and 532*c* for compute nodes 530*a*, 530*b*, and 530*c* respectively. As discussed above with regard to FIG. 4 and below with regard to FIGS. 8 and 9, the type of execution engine (e.g., DSL plan interpretation 436 or code generation and compilation 434) may change between segments. The output of one segment may be used as the input to another segment as well. Thus, the optimal (or available) execution technique (e.g., interpretation or code generation/compilation) may be chosen as segment boundaries, in some scenarios.

FIG. 6 illustrates example segments translated for using previously completed executors and generated code for compilation, according to some embodiments. Segment 610 provides an example of a segment of operations that include looping through columns of a hash table to determine distinct values. Code generation block for segment compilation is illustrated at 620. Domain-specific language to perform a segment using a previously compiled executer may be illustrated at 630. The various "print" features of code generation block 620 may be removed, as discussed according to the techniques above with regard to FIG. 4.

Although FIGS. 2-6 have been described and illustrated in the context of a database service, like a data warehouse service, the various components illustrated and described in FIGS. 2-6 may be easily applied to other database or data storage systems that provide access to database data. As such, FIGS. 2-6 are not intended to be limiting as to other embodiments of a storage engine, query engine, a single or distributed database engine or management system, processing cluster, or other component that may implement using computer resources to perform dynamic plan interpretation to perform queries, including resources, hosts, systems, or devices that are separate from the query engine or database management system itself (e.g., an external data replication store or system). FIG. 7 is a high-level flowchart illustrating methods and techniques to implement dynamic plan interpretation to perform queries, according to some embodiments. Various different systems and devices may implement the various methods and techniques described below with regard to FIGS. 7 through 9, either singly or working together. For example, a processing cluster, such as described above with regard to FIGS. 2-6 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 710, a query may be received at a database system, in some embodiments. As discussed above with regard to FIG. 1, queries may be received in various formats (e.g., through statements in a query language, through APIs or other interface-supported instructions, and so on). The query may be received, in some embodiments, with a parameter or other feature that indicates dynamic interpretation is enabled. In other embodiments, dynamic interpretation may be automatically enabled for the query by the database system (e.g., as a default setting).

As indicated at 720, a plan to perform the query may be generated, in some embodiments. Different query planning techniques may be implemented. For example, various statistics describing the various tables, collections, objects, or other requested data of the query may be evaluated to determine different costs for performing different operations as part of the query. Various rewrite rules to optimally order operations may be applied (e.g., pushing down filter operations). In some embodiments, multiple possible query plans may be generated and a lowest cost plan may then be selected.

As indicated at 730, a domain-specific language may be applied to interpret and execute at least a portion of the plan to perform the query using previously compiled executor(s) instead of generating and compiling code to execute the portion of the plan, in some embodiments. Application of the domain-specific language may occur in various different scenarios, as discussed above with regard to FIG. 4 and below with regard to FIGS. 8 and 9. In some embodiments, the plan may be evaluated to identify available previously compiled executors, selecting a combination of these previously compiled executors to perform the various steps of the plan. In some embodiments, the application of the domain-specific language and previously compiled executors may be performed in combination with also performing code generation and compilation and or using cached, compiled code objects from previous queries. In this way, various optimization techniques may be implemented to switch between interpretation and other sources of generating instructions to execute portions of the plan.

As indicated at 740, a result of the query may be returned according to an execution of the plan, in some embodiments. For example, different segments of a plan may be executed in parallel and their resulting outputs provided as input to further segments in the plan which may (or may not) execute in similar fashion (e.g., runtime generated and compiled code or previously compiled code executors).

Different considerations may be accounted for when choosing between using techniques that utilize a domain-specific language to interpret and use previously compiled executors and other options for performing a query. These considerations may be applied at a lower level of granularity than an entire query but instead at the segment-level. FIG. 8 is a high-level flowchart illustrating methods and techniques to implement evaluating segments of a query plan for execution, according to some embodiments.

As indicated at 810, a plan to perform a query may be divided into segments. Segments may include one (or more) operations that make up one (or more) steps of the plan. In some embodiments, the segments may be divided up by role assigned to a computing resource performing the segment (e.g., as illustrated above with regard to FIG. 5).

As indicated at 820, a segment may be selected to evaluate for execution, in some embodiments. In some embodiments, an execution order may be applied to the segments of a plan (e.g., working from leaf segments to a root segment, from the bottom up). In some embodiments, multiple segments may be selected and considered in parallel at 820 (e.g., the segments for all compute nodes).

As indicated at 830, a cache for prior queries that include a compiled object to execute the segment may be evaluated, in some embodiments. If a compiled code object exists (as indicated by the positive exit), then the compiled object may be used to execute the segment, as indicated at 832. Note, in some embodiments, further considerations, such as performance information that compares executors to cached compiled objects may cause a different selection, but the previous illustration is merely provided as an example of the way in which selection criteria might be applied.

Similarly, as indicated at 840, a previously compiled executor for the segment may be identified, in some embodiments. If so, as indicated by the positive exit, then the previously compiled executor may be used to execute the segment, as indicated at 842. Again, other considerations, such as the benefit or time to generate and compile code for the segment may be evaluated (e.g., using predicted execution times vs. predicted compilation times for the segment). Thus, the previous illustration is merely provided as an example of the way in which selection criteria might be applied.

As indicated at 850, code may be generated and compiled to perform the segment if no other source is identified. In some embodiments, generation and compilation of code may always be performed as a background task. In this way, the compiled code objects can be cached for a later query that is the same (or can be reused for a segment). In some scenarios, as discussed below with regard to FIG. 9, compilation can complete and still be used for an executing query.

As indicated at 860, segment evaluation may continue until no further segments are left to evaluate.

Figure 9:
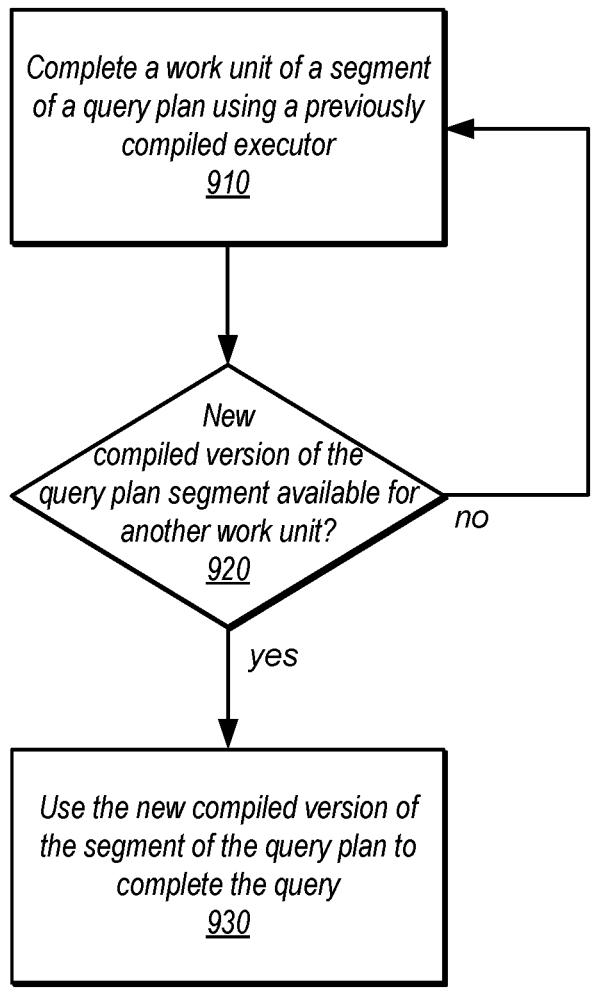
FIG. 9 is a high-level flowchart illustrating methods and techniques to switch from interpreted execution of a segment of a query plan to a new compiled version of the segment between work units when performing a query, according to some embodiments.

FIG. 9 is a high-level flowchart illustrating methods and techniques to switch from interpreted execution of a segment of a query plan to a new compiled version of the segment between work units when performing a query, according to some embodiments. In some embodiments, a segment may be repeatedly performed for different portions of data. For example, a scan and filter segment may operate over multiple ranges of data repeatedly. New instructions may not be generated for each iteration of the segment, but instead may be repeated. These iterations may be referred to as work units for the segment.

As indicated at 910, a work unit of a segment of query plan may be completed using a previously compiled executor 910. A determination may be made as to whether a new compiled version of the query plan segment is available for another work unit, as indicated at 920. For example, the background generation and compilation task may have completed for the segment while one or more work units are performed using previously compiled executors. If so, as indicated by the positive exit, then the new completed version of the segment of the query plan may be used to complete the query, in some embodiments, as indicated at 930. In this way, long-running compilation techniques which may produce performant executables for a segment may be taken advantage of even by an originating query (without having to be cached and used for a subsequent query).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamic plan interpretation to perform queries as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
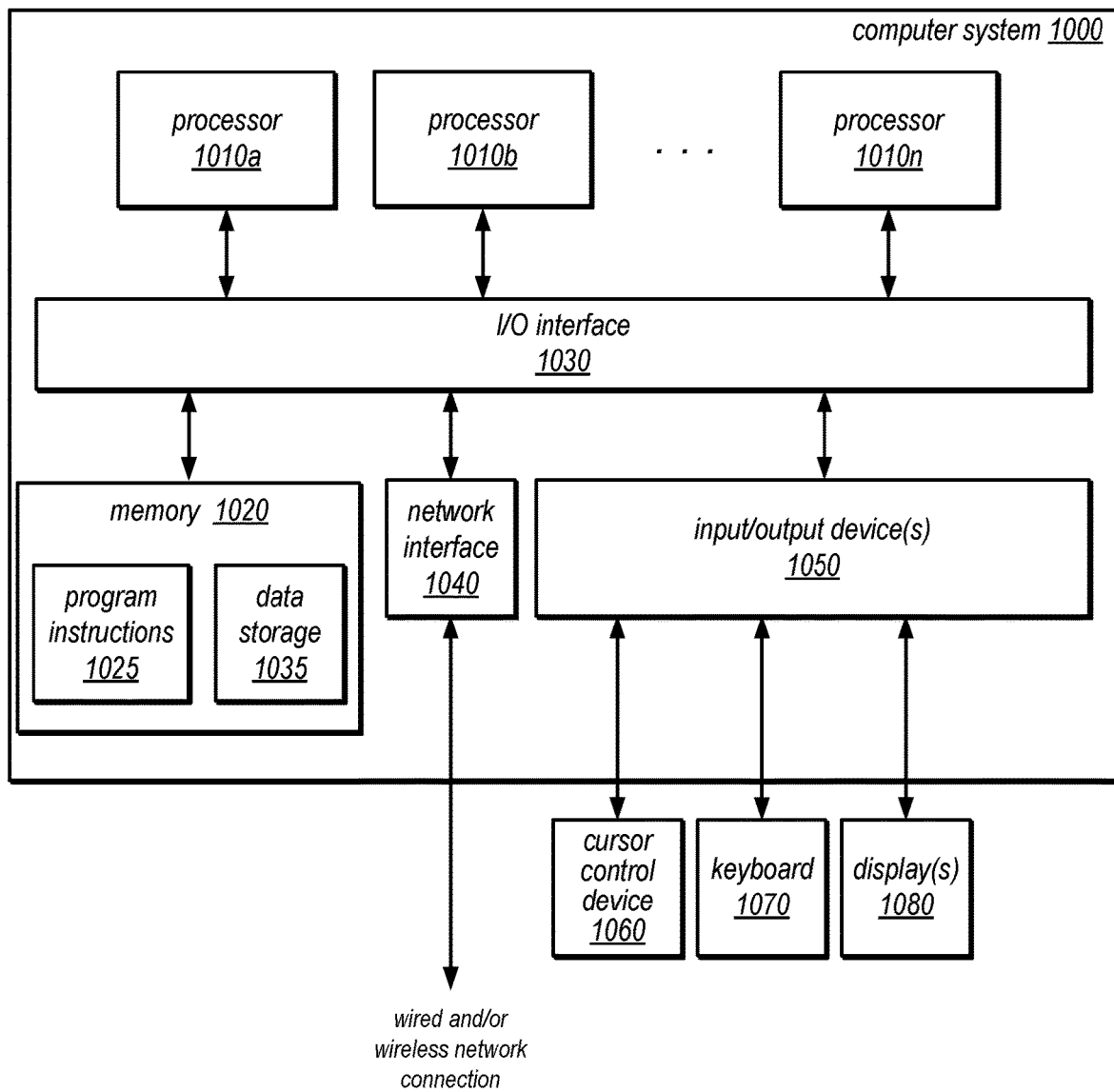
FIG. 10 illustrates an example system to implement the various methods, techniques, and systems described herein, according to some embodiments.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database system that implements both code generation with compilation and domain-specific language interpretation for query performance, wherein the database system is configured to:
- receive a query to a database;
- generate a plan to perform the query;
- evaluate the plan to select between the code generation with compilation and the domain-specific language interpretation, for at least a portion of the plan, wherein the evaluation selects application of a domain-specific language to interpret and execute the portion of the plan to perform the query using one or more previously compiled executors instead of selecting to use the code generation with compilation implemented by the database system to execute the portion of the plan, wherein the one or more previously compiled executors were not compiled for a prior query received at the database system; and
- return a result of the query obtained according to an execution of the plan.

2. The system of claim 1, wherein the portion of the plan is a first segment of the plan and wherein the database system is further configured to generate and compile other code to execute a different segment of the plan to perform the query.

3. The system of claim 1, wherein the database system is further configured to determine that a prior query compiled code object cache does not store a compiled code object to perform the query.

4. The system of claim 1, wherein the database system is a data warehouse service offered by a provider network.

5. A method, comprising:
- receiving a query at a database system;
- generating, by the database system, a plan to perform the query, wherein the database system implements both code generation with compilation and domain-specific language interpretation for query performance;
- applying, according a selection between the code generation with compilation and the domain-specific language interpretation by the database system, a domain-specific language to interpret and execute at least a portion of the plan to perform the query using one or more previously compiled executors instead of selecting to use the code generation with compilation implemented by the database system to execute the portion of the plan, wherein the one or more previously compiled executors were not compiled for a prior query received at the database system; and
- returning, by the database system, a result of the query obtained according to an execution of the plan.

6. The method of claim 5, wherein the portion of the plan is a first segment of the plan, and wherein the method further comprises generating and compiling other code to execute a different segment of the plan to perform the query.

7. The method of claim 5, wherein the portion of the plan is a first segment of the plan, and wherein the method further comprises applying the domain-specific language to interpret and execute another segment of the plan to perform the query using at least one previously compiled executor.

8. The method of claim 5, wherein applying the domain-specific language to interpret and execute the portion of the plan to perform the query using one or more previously compiled executors comprises using a just-in-time engine to generate an expression tree for the portion of the plan for invoking the one or more previously compiled executors.

9. The method of claim 5, further comprising determining, by the database system, that a prior query compiled code object cache does not store a compiled code object to perform the query.

10. The method of claim 5, further comprising:
- responsive to detecting a failure of a further one or more previously compiled executors to execute another portion of the plan, performing, by the database system, the other portion of the plan by generating and compiling other code to execute the other portion of the plan.

11. The method of claim 5, wherein the selection between the code generation with compilation and the domain-specific language interpretation is made based, at least in part, on a performance evaluation of the one or more previously compiled executors for the portion of the plan.

12. The method of claim 5, further comprising determining, by the database system, a predicted attribute for the query, wherein the predicted attribute for the query is compared with one or more criteria, and wherein the applying the domain-specific language to interpret and execute the portion of the plan to perform the query is performed responsive to determining that the predicted attribute satisfies the one or more criteria.

13. The method of claim 5, wherein the database system is a distributed database system comprising a leader node and one or more compute nodes, wherein the query plan comprises respective operations to perform at the leader node and the one or more compute nodes, and wherein the portion of the plan corresponds to one or more of the respective operations to be performed by one of the one or more compute nodes.

14. One or more non-transitory, computer-readable storage media, storing program instructions that when executed on or across one or more computing devices cause the one or more computing devices to implement:
- receiving a query to a database at a database system that implements both code generation with compilation and domain-specific language interpretation for query performance;
- generating a plan to perform the query; and
- executing the plan to return a result of the query, wherein in executing the plan, the program instructions cause the one or more computing devices to implement applying, according a selection between the code generation with compilation and the domain-specific language interpretation by the database system, a domain-specific language to interpret and execute at least a portion of the plan to perform the query using one or more previously compiled executors instead of selecting to use the code generation with compilation implemented by the database system to execute the portion of the plan, wherein the one or more previously compiled executors were not compiled for a prior query to the database.

15. The one or more non-transitory, computer-readable storage media of claim 14, wherein the portion of the plan is a first segment of the plan, and wherein the one or more non-transitory, computer-readable storage media store further program instructions that when executed on or across the one or more computing devices cause the one or more computing devices to further implement generating and compiling other code to execute a different segment of the plan to perform the query.

16. The one or more non-transitory, computer-readable storage media of claim 14, wherein execution of the portion of the plan according to the one or more previously compiled executors is for a first work unit of a segment corresponding to the portion of the plan, and wherein the one or more non-transitory, computer-readable storage media store further program instructions that when executed on or across the one or more computing devices, cause the one or more computing devices to further implement-using a compiled code object generated for the segment of the plan to perform a second work unit of the segment as part of executing the plan.

17. The one or more non-transitory, computer-readable storage media of claim 14, storing further program instructions that when executed on or across the one or more computing devices cause the one or more computing devices to further implement determining, by the database system, that a prior query compiled code object cache does not store a compiled code object to perform the query.

18. The one or more non-transitory, computer-readable storage media of claim 14, storing further program instructions that when executed on or across the one or more computing devices cause the one or more computing devices to further implement:

responsive to detecting a failure of an attempt to generate code and compile the portion of the plan, performing the applying the domain-specific language to interpret and execute the portion of the plan to perform the query using the one or more previously compiled executors.

19. The one or more non-transitory, computer-readable storage media of claim 14, storing further program instructions that when executed on or across the one or more computing devices cause the one or more computing devices to further implement determining a predicted execution time for the query, wherein the predicted execution time for the query is below a threshold, and wherein the applying the domain-specific language to interpret and execute the portion of the plan to perform the query is performed responsive to determining that the predicted execution time is below the threshold.

20. The one or more non-transitory, computer-readable storage media of claim 14, wherein the one or more computing devices are implemented as part of a data warehouse service offered by a provider network.

* * * * *